United States Patent [19]

Eto et al.

[11] 4,409,627
[45] Oct. 11, 1983

[54] VIDEO SIGNAL DECODING CIRCUIT

[75] Inventors: Yoshizumi Eto, Sagamihara; Yasuhiro Hirano, Hachioji, both of Japan

[73] Assignee: Hitachi Denshi Kabushiki Kaisha, Tokyo, Japan

[21] Appl. No.: 184,313

[22] Filed: Sep. 5, 1980

[30] Foreign Application Priority Data

Sep. 10, 1979 [JP] Japan ............................. 54-115282

[51] Int. Cl.³ ............................................. H04N 5/94
[52] U.S. Cl. ................................. 360/38.1; 360/37.1; 358/336
[58] Field of Search ...................... 360/38, 33, 32, 53, 360/51, 37, 27, 38.1, 33.1, 37.1; 358/127, 335, 336, 314; 369/48; 365/233; 371/65, 61; 375/108; 328/120

[56] References Cited

U.S. PATENT DOCUMENTS 3,571,525  3/1971  Miller ............................. 360/38
4,063,284  12/1977  Tatomi ........................... 360/38
4,224,642  9/1980  Mawatari ....................... 360/38.1

Primary Examiner—Alan Faber
Attorney, Agent, or Firm—Antonelli, Terry & Wands

[57] ABSTRACT

In order to prevent deterioration of a reproduced picture quality due to lack of the clock signals, a video signal decoding circuit produces quasi-code signals when the lack of clock signal is detected.

6 Claims, 20 Drawing Figures

VIDEO SIGNAL DECODING CIRCUIT

BACKGROUND OF THE INVENTION

1. Field of the Invention

The present invention relates to a decoding circuit, and more particularly to a video signal decoding circuit, which is used in the reproducing period in a case where encoded signals are recorded in and reproduced from a magnetic recorder.

2. Description of the Prior Art

In a case where a video signal such as a television signal is recorded on a magnetic recording tape, the video signal is usually stored in the form of an analog signal. In recent years, however, owing to a rapid progress in digital circuit technology, a strong demand for a good quality of television picture and the like, digital precessing devices for a television signal have been widely employed in the field of broadcasting. In accordance therewith, there have been actively developed devices for magnetically recording a pulse-coded digital television signal in a tape recorder and for reproducing the recorded signal. The devices for magnetically recording and reproducing the digital television signal encounter a problem that the signal has to be recorded at a high density in order to store a large amount of information in a small-sized recording medium. Accordingly, the code error is inevitably increased, and the reproduced picture quality is deteriorated due to the code error. Thus, a main advantage of the digital devices for recording and reproducing a television signal is lost.

In order to eliminate such code error, coding techniques have been improved in addition to improvements in the magnetic recording medium and device. For example, when a digital television signal is recorded, there is conducted such a coding process as the addition of an error correcting (or detecting) code, the change of the sequence of codes in a code train, namely, the interlieving process, or the randomizing process for making the generation probability of a code having a level of "1" equal to that of a code having the level of "0". When a signal subjected to such a process is reproduced from a magnetic recorder, an inverse process is conducted on the recorded signal in accordance with the rule of the process in the recording period to obtain a code train corresponding to an original television signal. In many cases, the code train thus obtained is then subjected to digital-to-analog conversion to reproduce an analog television signal.

The inverse process in the reproducing period is conducted in a digital manner, and a binary code signal reproduced from the magnetic recorder is processed using a clock signal which is reproduced in the same manner as the binary code signal. Further, the above process in the reproducing period is conducted for every block formed of a code train in one horizontal scanning period, and therefore makes use of a synchronous code interposed between the blocks, as a reference.

In the above operation for magnetically recording and reproducing a digital signal, a drop-out may be generated due to dust and scratches on a magnetic recording medium. In such a case, not only the reproduced code pulses but also the reproduced clock pulses are missing from a reproduced signal. When the clock pulses are missing, the reproduction of a code signal cannot be normally conducted even at that part of the code signal where the code pulses are not missing, as will be explained later in detail. In order to prevent the absence of clock pulses even in a case where a drop-out is generated, a countermeasure has been considered in which a clock signal detected from a magnetic recording medium is applied to a resonating circuit having a high Q-value to compensate the lack of clock signal. However, since the drawing time of the resonating circuit is longer as the Q-values are higher, the resonating circuit cannot follow the jitter in the detected signal, and therefore the reproduced picture quality is deteriorated. Thus, such a countermeasure cannot bring a fundamental solution.

SUMMARY OF THE INVENTION

A main object of the present invention is to provide a decoding circuit in which, in reproducing a magnetically-recorded digital signal, a wrong reproducing process for a code signal is restricted to the part of the code signal where clock pulses are missing, and the drop-out of clock pulses has not a bad influence upon a decoding process for the remaining part of the code signal where clock pulses are normally generated.

In order to attain the above and other objects, a device according to the present invention for reproducing a video signal which is magnetically recorded in the form of a digital code signal made up of unit blocks each having a predetermined length, generates a quasi code while reproduced clock pulses are missing and decodes the quasi-code to use the decoded quasi-code as recorded information, when the absence of reproduced clock pulses is detected.

That is, a decoding circuit according to the present invention detects the presence or absence of a clock pulse, restricts the generation of code error to a period when one or more clock pulses are missing, reproduces a correct code signal during a period when clock pulses are normally generated, and therefore can reduce the total of code error.

Further, since the generation of code error due to a drop-out is restricted by the use of a circuit according to the present invention, the code error can be exactly corrected by employing an error correcting or detecting code together with the circuit according to the present invention, or can be reduced to the extent that the code error is substantially undetected, by substituting a code on a preceding scanning line for a part of a code signal.

Further, even when the error detecting code is not employed, the code error can be corrected by using a code on a preceding scanning line as a quasi-code only in a period when clock pulses are missing.

DESCRIPTION OF THE PREFERRED EMBODIMENTS

Figure 1:
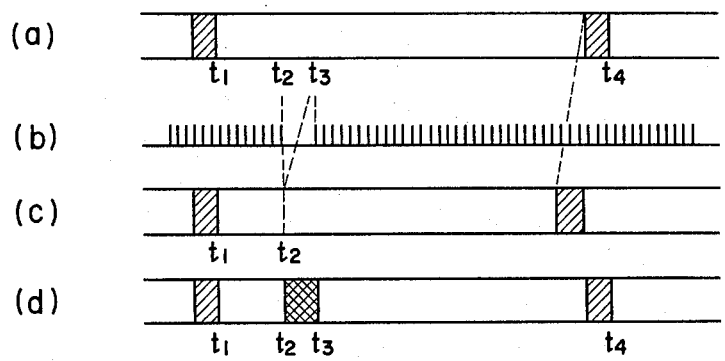
FIG. 1 comprised of a-d is a time chart for explaining the operational principle of a decoding circuit according to the present invention.

In FIG. 1 for explaining a general idea of the present invention, reference symbol (a) designates a reproduced code train of an information signal made up of blank areas where a code signal corresponding to a video signal is present, and hatched areas corresponding to a synchronous signal, (b) a reproduced clock signal in which several clock pulses are missing at a period from $t_2$ to $t_3$, (c) a reproduced code train obtained when a code train is processed (for example, temporarily stored in a memory) using the reproduced clock signal (b) showing the absence of several clock pulses, and (d) a reproduced code train obtained when the code train is processed by a decoding circuit according to the present invention. As is shown in FIG. 1, when the code train is processed using the reproduced clock signal (b) having a part where clock pulses are missing, without taking any countermeasure, there is obtained the reproduced code train (c) which behaves as if several codes were originally missing at the period from $t_2$ to $t_3$. That is, the sequence of codes in the reproduced code train (c) is deviated from that in the reproduced code train (a). Therefore, when the code train is reproduced using the reproduced clock signal (b) and using a synchronous pulse $t_1$ as a reference, the correct processing is conducted at a period from $t_1$ to $t_2$ but the wrong processing is conducted at a period from $t_2$ to $t_4$. After the time $t_4$, the correct processing is conducted since the time $t_4$ is used as the reference. As is apparent from the above, in spite of the fact that the absence of clock pulses due to the drop-out takes place only at the period from $t_2$ to $t_3$, the reproduced code train is affected by the drop-out throughout the period from $t_2$ to $t_4$ (though the generation of code error at the period from $t_2$ to $t_3$ is considered as an inevitable consequence of the drop-out).

For example, even when only one clock pulse is missing from a television signal due to the drop-out, the scanning line subjected to the drop-out becomes erroneous after the generation of the drop-out, and therefore the reproduced picture quality is considerably deteriorated.

According to the present invention, the reproduced clock signal is monitored, and a quasi-code is inserted between the time $t_2$ and $t_3$, as is shown in the signal (d), when detecting means detect the fact that clock pulses are missing from the reproduced clock signal at the period from $t_2$ to $t_3$, in order to make correct code pulses correspond to correct positions (or correct time) at the period from $t_3$ to $t_4$. Indeed, the code error is generated at the period from $t_2$ to $t_3$, since the quasi-code pulses are not equal to the correct code pulses, but the code signal at the period from $t_3$ to $t_4$ is not affected by the generation of drop-out. Further, since the code train for an information signal becomes erroneous simultaneously with the drop-out of clock pulses, the insertion of the quasi-code pulses will not bring a substantial increase in code error.

Figure 2:
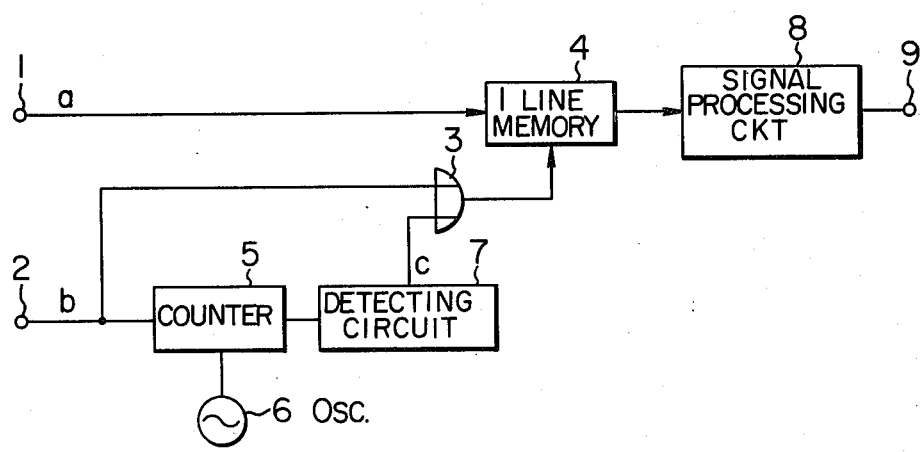
FIG. 2 comprised of a and b is a block diagram showing an embodiment of a decoding circuit according to the present invention.
Figure 3:
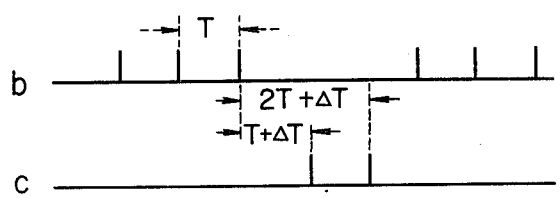
FIG. 3 is a time chart for explaining the operation of the embodiment shown in FIG. 2.

FIG. 2 shows an embodiment of a decoding circuit according to the present invention, and FIG. 3 is a time chart for explaining the operation of the above embodiment. Referring to FIG. 2, a code signal a which has been read by a magnetic head or the like, is applied to an input terminal 1, if necessary, through an amplifier (not shown), and a clock signal b extracted from the code signal a is applied to an input terminal 2. The signal a is applied to a memory 4 having a storage capacity corresponding to the amount of information on one horizontal scanning line, and then applied to a signal processing circuit 8 having such functions as the correction of code error and the digital-to-analog conversion to deliver a reproduced signal from an output terminal 9. The detailed explanation of the signal processing circuit 8 is omitted for brevity's sake, since the circuit 8 is well known and moreover has no immediate connection with the present invention.

When any clock pulse is not missing from the clock signal b, clock pulses are successively applied as write control pulses to the memory 4 through an OR gate circuit 3, and therefore the correct signal processing can be conducted. When one or more clock pulses are missing from the clock signal b, that is, when a signal b shown in FIG. 3 is employed, a signal c shown in FIG. 3 for compensating for the missing pulses in the clock signal b is generated by an oscillator 6, a clock interval detecting circuit 5 and a detecting circuit 7, and applied as a clock signal to the memory 4 through the OR gate circuit 3. In more detail, the oscillator 6 generates a clock signal having a frequency far higher than that of the clock signal b, and the clock interval detecting circuit 5 counts up the output pulses of the oscillator 6 and is reset by the clock signal b. Accordingly, the circuit 5 delivers a count value which is proportional to a period when clock pulses are missing from the clock signal b, when the drop-out of clock pulses takes place. The detecting circuit 7 generates one pulse when the above count value expressed in terms of time becomes equal to $nT + \Delta T$ (where n, T and $\Delta T$ denote a positive integer, a period of the clock signal b and a positive value smaller than T, respectively). Incidentally, the value of $\Delta T$ is selected so as to make any varied time interval between adjacent clock pulses caused by jitter smaller than $T + \Delta T$, provided that the drop-out does not take place, and so as to exhibit the appearance of two or more clock pulses in a period of $T + \Delta T$.

According to the above embodiment, the detecting circuit 7 delivers the output signal c shown in FIG. 3. Though the pulses in the output signal c are deviated in phase from the pulses in the clock signal b, the total number of clock pulses applied to the memory 4 is kept constant in spite of the generation of drop-out, since the number of pulses delivered from the OR gate circuit 3 is equal to the sum of the number of the clock pulses in the clock signal b and the number of pulses in the output signal c. As a result, the memory 4 delivers a signal such as the signal (d) in FIG. 1. That is, erroneous codes are generated at the period from $t_2$ to $t_3$ due to the fact that the pulses in the output signal c are deviated in phase, but correct codes are generated at the remaining period. Since the erroneous codes can be considered as a kind of quasi-code signal, the above-mentioned embodiment replaces a code signal by the quasi-code signal only at the period from $t_2$ to $t_3$.

Figure 4:
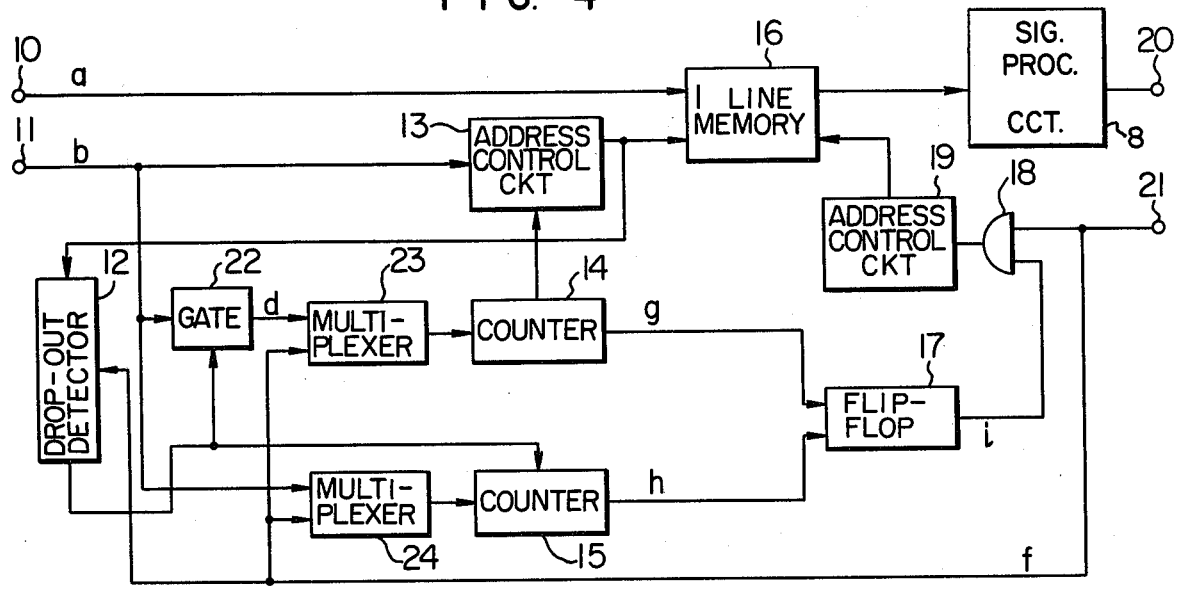
FIG. 4 is a block diagram showing another embodiment of a decoding circuit according to the present invention.
Figure 5:
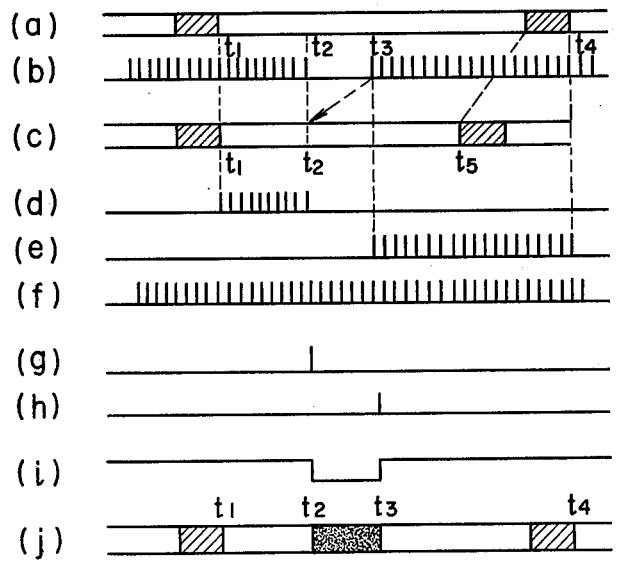
FIGS. 5, comprising of a–j and 6a and 6b are time charts each for explaining the operation of the embodiment shown in FIG. 4.

FIG. 4 shows another embodiment of a decoding circuit according to the present invention, and FIG. 5 is a time chart for explaining the operation of this embodiment. In this embodiment, the absence of one or more clock pulses due to drop-out is prevented from exerting an adverse effect on a code signal, by controlling an address for a memory which is formed of a random access memory (RAM) or the like and has a storage capacity corresponding to the amount of information on one horizontal scanning line. An actual device according to the present invention includes two or three decoding circuits, each of which has such a structure as shown in FIG. 4. In this device, a horizontal synchronous signal is extracted from an input signal, and each of writing and reading operations for a memory and the corresponding one for another memory are alternately changed over by the horizontal synchronous signal. In order to simplify the explanation, however, only the decoding operation with respect to one horizontal scanning line will be explained below.

First, the writing operation (or writing mode) will be shown. Input terminals 10 and 11 are applied with an input signal a and a clock signal b such as indicated by reference symbols (a) and (b) in FIG. 5, respectively. The clock signal b is applied to an address control circuit 13, and the input signal a is written in a memory 16 at positions specified by an address signal from the address control circuit 13. The address signal is not changed for a period where one or more clock pulses are missing, and therefore that part of the input signal a which corresponds to the above period, is not written in the memory 16. Accordingly, when one or more clock pulses are missing in a horizontal scanning period, the input signal a is stored in the memory 16 in a constricted form, as indicated by reference symbol (c) in FIG. 5.

A counter 14 counts up the clock pulses during a period from the beginning $t_1$ of a horizontal scanning line to a time $t_2$ when the first absence of clock pulse is detected, to form memory addresses, and stores therein the last memory address and the total number of counted clock pulses. In other words, the counter 14 counts up pulses in a pulse train (d) shown in FIG. 5. Further, a counter 15 conducts a counting operation during a period from a time $t_3$ when the absence of clock pulses terminates, to the end $t_4$ of the horizontal scanning period, namely, during a period corresponding to a pulse train (e) shown in FIG. 5. The result of this counting operation is used to correctly perform the reading operation (for the memory 16) which will be explained later. In more detail, the counter 14 is formed of an up-counter and set by a horizontal synchronous signal, and the count value of the counter 14 is advanced by an individual clock pulse in the clock signal d. The clock signal b is applied to the counter 14 through a gate circuit 22 and a multiplexer 23. Reference numeral 12 denotes a drop-out detector for detecting the absence of clock pulses, which is connected to receive with the output of the address control circuit 13 and indicates the absence of clock pulses when an address signal is not generated for several clock periods. For example, when the drop-out detector 12 is made up of a three-stage shift register and an exclusive OR logic circuit for outputs of respective stages of the shift register, the detector 12 can detect the absence of three clock pulses or more. When the drop-out of one or more clock pulses is generated, the gate circuit 22 is kept in the off-state till the next horizontal synchronous signal is applied thereto. Thus, the counter 14 can store therein an address corresponding to the end of the pulse train (d) shown in FIG. 5 and the total number of pulses in the pulse train (d). Further, the counter 15 is formed of a down-counter, and the total number of clock pulses generated in one horizontal scanning period is first set in the counter 15. The count value of the counter 15 is decremented each time one clock pulse is applied to the counter 15 through a multiplexer 24. The counter 15 is again loaded (that is, the total number of clock pulses generated in one horizontal scanning period is again set in the counter 15) by a drop-out indicating signal from the drop-out detector 12. Accordingly, when the drop-out of clock pulses is not generated, the count value of the counter 15 becomes equal to zero at the end of each horizontal scanning period. When the drop-out of clock pulses is generated, subtraction is conducted in the counter 15 during a period from the termination $t_3$ of the drop-out to the end $t_4$ of the horizontal scanning period, that is, the number of pulses in the pulse train (e) shown in FIG. 5 is subtracted from the count value set in the counter 15. Thus, the counter 15 stores therein a value which is obtained by subtracting the number of pulses in the pulse train (e) from the total number of clock pulses generated in one horizontal scanning period, namely, the number of clock pulses corresponding to the period from $t_1$ to $t_3$ and an address of the memory 16 corresponding to the time $t_3$.

Figure 6:
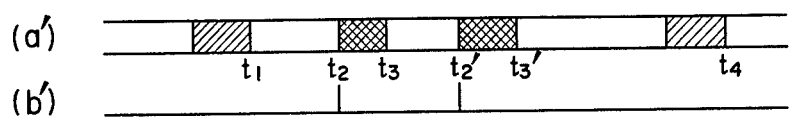

Further, in a case where the drop-out is generated plural times in one horizontal scanning period, the address of the address control circuit 13 is changed to the address stored in the counter 14 each time the drop-out is generated. Accordingly, in the writing operation, the address control circuit 13 delivers the same memory address at occurrence of each drop-out. For example, in a case where the drop-out, as in a signal (a') shown in FIG. 6, is generated twice (at a period from $t_2$ to $t_3$ and at a period from $t_2'$ to $t_3'$) in one horizontal scanning period, the drop-out detector 12 delivers a drop-out indicating pulse at $t_2$ and $t_2'$, as shown in a drop-out indicating signal (b') in FIG. 6, and the address stored in the counter 14 at the time $t_2$ is transferred to the address control circuit 13 at $t_2'$. Accordingly, at a time immediately before the time $t_2'$, although the address control circuit 13 delivers the address corresponding to the sum of a period from $t_1$ to $t_2$ and a period from $t_3$ to $t_2'$, at the time $t_2'$, the address of the circuit 13 is changed to the address corresponding to the time $t_2$, as a result, a period from $t_2$ to $t_3'$ behaves as a single drop-out period.

Next, explanation will be made on the reading operation (or reading mode) for the memory 16. A clock terminal 21 is connected to receive a clock signal (f) shown in FIG. 5. The clock signal (f) is equal in frequency to the clock signal (b) applied to the terminal 11, but has neither jitter in frequency nor drop-out. The clock signal (f) is applied through the multiplexers 23 and 24 to the counters 14 and 15, which count the number of clock pulses from the beginning of a horizontal scanning period and deliver pulses (g) and (h) shown in FIG. 5, respectively, when respective count values of the counters 14 and 15 become equal to the values which were stored in the writing operation. The pulse (g) indicates the time $t_2$ when the drop-out is generated in the writing operation, and the pulse (h) shows the time $t_3$ when the drop-out is terminated. These pulses (f) and (h) are applied to a clock control circuit 17 (for use in reading operation), which is formed of a flip-flop circuit and delivers a signal (i) shown in FIG. 5. The signal (i) is kept in the level of "0" during a period from the time when the pulse (g) is outputted from the counter 14, to the time when the pulse (h) is outputted from the counter 15, and is kept in the level of "1" during the remaining period of the horizontal scanning line. In other words, the signal (i) indicates a period from the beginning of the drop-out to the end thereof. The clock signal (f) applied to the terminal 21 is supplied to an address control circuit 19 (for use in reading operation) through an AND gate circuit 18 which is driven by the signal (i). Accordingly, when the drop-out of clock pulses is generated in the writing period, the address control circuit 19 delivers identical memory addresses for a period corresponding to the above drop-out. As a result, a signal is repeatedly read out of the memory 16 for this period. This corresponds to the previously-mentioned quasi-code. Thus, the memory 16 delivers from an output terminal 20 a code signal (j) shown in FIG. 5. The code signal (j) includes correct codes at each of a period from the beginning $t_1$ to the generation $t_2$ of the drop-out and a period from the termination $t_3$ of the drop-out to the end $t_4$ of the scanning line. That is, a period after the time $t_3$ is not affected by the drop-out.

In the foregoing description, it is assumed that the drop-out of clock pulses is generated in a video signal and a synchronous signal can be always detected exactly. In fact, the drop-out may be generated for a period containing a synchronous signal. However, since the synchronous signal has a constant frequency, a synchronous signal separating circuit can be readily constructed using the constant-frequency characteristic of the synchronous signal. The adverse effect by the absence of a synchronous signal can be eliminated by the use of the synchronous signal separating circuit.

We claim:

1. A video signal decoding circuit for decoding a received video code signal which is accompanied by a clock signal comprised of pulses synchronized with the video code signal comprising:
   memory means for storing said video code signal in synchronism with said clock signal;
   signal processing means coupled to said memory means for decoding the data stored in said memory means;
   first means for detecting a drop-out of pulses in only said clock signal; and
   second means coupled to said memory means for producing a quasi-code in that portion of the video code signal which occurs only when a drop-out of said clock signal is detected by said first means.

2. A video signal decoding circuit according to claim 1, wherein said second means comprises pulse generator means for producing pulses compensating for the drop-out of said clock signal when said first means detects the drop-out, and third means for writing a video code signal into said memory means as the quasi-code signals during the time corresponding to said drop-out.

3. A video signal decoding circuit according to claim 1, wherein said first means comprises signal generator means for generating a counting signal having a frequency exceeding that of said clock signals and counter means connected to be driven by said counting signal and reset by said clock signal for generating an enabling pulse signal in the absence of receipt of a clock pulse.

4. A video signal decoding circuit according to claim 3, wherein said memory means is connected to receive said clock signal as a write data control signal, and said second means comprises pulse generator means responsive to said enabling pulse signal from said counter means for supplying a write data control signal to said memory means upon detection of the absence of a clock pulse in said clock signal by said first means.

5. A video signal decoding circuit according to claim 1, wherein said second means comprises means for producing repeatedly the video code signal which was stored in said memory means in response to the clock pulse received immediately before said first means detected said drop-out when video code signals corresponding to said drop-out are read out from said memory means.

6. A video signal decoding circuit according to claim 5, wherein said memory means comprises a random access memory, and said second means comprises writing address control means actuated by said clock signal for generating successive write-in addresses for storage of said video code signal into said random access memory, read address control means for generating successive read-out addresses for effecting read-out of said video code signal from said random access memory in response to a read clock signal, first detecting means for detecting during said writing operation the number of clock pulses received from the start of one horizontal scanning line portion of the video code signal and the beginning of said detected drop-out and for storing the addresses of said random access memory at which is stored the video code signal corresponding to the clock signal received immediately before the generation of the drop-out, second detecting means for detecting during said writing operation the number of clock pulses received from the point of termination of said drop-out to the end of said one horizontal scanning line portion and for storing an address of said random access memory at which is stored a video code signal corresponding to the clock signal received immediately after the termination of said drop-out, and means for providing during the reading operation a signal which inhibits a change of address by said read address control means during said drop out in response to the addresses stored in said first and second detecting means in order to read out a video code signal stored at the same address of said random access memory repeatedly as said quasi-code signal during the drop-out.

* * * * *